US012741273B2

(12) United States Patent
Dodin et al.

(10) Patent No.: US 12,741,273 B2
(45) Date of Patent: Sep. 22, 2026

(54) HYDROCRACKING CATALYST COMPRISING A ZEOLITE Y SPECIFIC FOR THE PRODUCTION OF NAPHTHA

(71) Applicant: IFP ENERGIES NOUVELLES, Rueil-Malmaison (FR)

(72) Inventors: Mathias Dodin, Rueil-Malmaison Cedex (FR); Antoine Daudin, Rueil-Malmaison Cedex (FR); Mickael Rivallan, Rueil-Malmaison Cedex (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 202 days.

(21) Appl. No.: 18/713,332

(22) PCT Filed: Nov. 21, 2022

(86) PCT No.: PCT/EP2022/082617
§ 371 (c)(1),
(2) Date: May 24, 2024

(87) PCT Pub. No.: WO2023/094319
PCT Pub. Date: Jun. 1, 2023

(65) Prior Publication Data

US 2025/0018379 A1 Jan. 16, 2025

(30) Foreign Application Priority Data

Nov. 29, 2021 (FR) .................................... 2112646

(51) Int. Cl.

| | |
|---|---|
| ***B01J 29/16*** | (2006.01) |
| ***B01J 23/883*** | (2006.01) |
| ***B01J 29/78*** | (2006.01) |
| ***B01J 29/80*** | (2006.01) |
| ***B01J 35/61*** | (2024.01) |
| ***B01J 35/63*** | (2024.01) |
| ***B01J 37/02*** | (2006.01) |
| ***C10G 47/20*** | (2006.01) |

(52) U.S. Cl.
CPC ........... *B01J 29/166* (2013.01); *B01J 23/883* (2013.01); *B01J 29/7815* (2013.01); *B01J 29/80* (2013.01); *B01J 35/617* (2024.01); *B01J 35/633* (2024.01); *B01J 37/0201* (2013.01); *C10G 47/20* (2013.01); *C10G 2300/1074* (2013.01)

(58) Field of Classification Search
CPC .... C01J 23/883; C01J 29/166; C01J 29/7815; C01J 29/80; C01J 35/617; C01J 35/633; C01J 37/0201; C10G 47/20; C10G 2300/1074
See application file for complete search history.

(56) References Cited

U.S. PATENT DOCUMENTS

| | | | | |
|---|---|---|---|---|
| 3,308,069 | A | 3/1967 | Wadlinger et al. | |
| 4,309,277 | A * | 1/1982 | O'Hara | C10G 49/08 208/111.15 |
| 5,139,759 | A | 8/1992 | Cannan et al. | |
| 5,208,197 | A | 5/1993 | Vassilakis et al. | |
| 7,510,645 | B2 | 3/2009 | Wang | |
| 7,608,299 | B2 | 10/2009 | Decams et al. | |
| 7,611,689 | B2 | 11/2009 | Creyghton et al. | |
| 9,340,734 | B2 | 5/2016 | Domokos et al. | |
| 2002/0094931 | A1* | 7/2002 | Wang | B01J 29/08 502/63 |
| 2016/0121313 | A1* | 5/2016 | Zhang | B01J 35/66 502/66 |

OTHER PUBLICATIONS

International Search Report PCT/EP2022/082617 dated Feb. 27, 2023 (pp. 1-2).

* cited by examiner

*Primary Examiner* — James C Goloboy
(74) *Attorney, Agent, or Firm* — Csaba Henter; MILLEN, WHITE, ZELANO & BRANIGAN, P.C.

(57) ABSTRACT

The invention describes a hydrocracking catalyst which is selective towards the naphtha cut and the hydrocracking process using said catalyst, said catalyst comprising at least one hydrogenating-dehydrogenating element chosen from the group formed by the elements of group VIB and the non-noble elements of group VIII of the Periodic Table, taken alone or as a mixture, and a support comprising at least one porous mineral matrix, a zeolite Y having an initial lattice parameter $a_0$ of the unit cell of greater than 24.42 Å, and a zeolite beta, in which the weight ratio of said zeolite Y to said zeolite beta in the catalyst is strictly greater than 12.

20 Claims, No Drawings

HYDROCRACKING CATALYST COMPRISING A ZEOLITE Y SPECIFIC FOR THE PRODUCTION OF NAPHTHA

FIELD OF THE INVENTION

The invention relates to a hydrocracking catalyst based on zeolite USY and also the use thereof for the production of naphtha by hydrocracking of petroleum cuts of the vacuum distillate and gas oil type. This type of process is notably used in schemes intended for the conversion of hydrocarbon feedstocks for the production of petrochemical intermediates and gasoline fuels.

Hydrocracking catalysts are generally classified on the basis of the nature of their acid function, in particular catalysts comprising an amorphous acid function of silica-alumina type and catalysts comprising a zeolitic cracking function such as zeolite Y or zeolite beta.

Hydrocracking catalysts are also classified according to the major product obtained when they are used in a hydrocracking process, the two main products being middle distillates and naphtha.

Naphtha or naphtha cut is understood to mean the petroleum fraction having a boiling point lower than the middle distillates cut. The middle distillates cut generally has a cut point between 150° C. and 370° C. to maximize the production of kerosene and gas oil. Nevertheless, in the case of a process targeted specifically at the production of naphtha for example, the lower cut point of the middle distillates cut can be increased in order to increase the yields of naphtha.

For this purpose, the naphtha cut can have boiling points between the boiling point of hydrocarbon compounds having 6 carbon atoms per molecule (or 68° C. boiling point) up to 216° C. and includes the gasoline cut.

There is a high demand for gasoline and naphtha cuts. This is the reason why refiners have been focusing for several years on hydrocracking catalysts that are selective towards the naphtha cut.

It is known to use catalysts based on FAU-type zeolite to produce a naphtha cut.

U.S. Pat. No. 7,611,689 (Shell) describes a FAU-type zeolite Y, a catalyst comprising said zeolite, the preparation thereof and the use thereof in a hydrocracking process. In particular, the FAU zeolite has a lattice parameter of between 24.40 and 24.50 angstroms (Å), a silica-alumina mole ratio (SAR) of between 5 and 10 and an alkali metal content of less than 0.15% by weight. It is demonstrated that such zeolites have a high selectivity towards the naphtha cut and in particular a high selectivity towards the heavy naphtha cut, when they are used in a hydrocracking process.

Patent application WO 11/067258 (Shell) describes the preparation of a FAU zeolite having a lattice parameter of between 24.42 and 24.52 angstroms (Å), a silica-alumina mole ratio (SAR) of between 10 and 15, and a surface area of between 910 and 1020 $m^2/g$. The family teaches that the catalyst comprising this zeolite is particularly selective towards the naphtha cut when used in a process for converting hydrocarbon cuts.

Patent application WO 04/0487988 (Shell) describes a hydrocracking process using a catalyst comprising a zeolite Y having a low lattice parameter of between 24.10 and 24.40 angstroms (Å), a silica-alumina mole ratio (SAR) of greater than 12 and preferably between 20 and 100, a BET specific surface area of greater than 850 $m^2/g$ and a micropore volume of greater than 0.28 ml/g. WO 04/0487988 teaches that zeolites with a low lattice parameter are known to be selective towards the middle distillate cut but less active than zeolites with a higher lattice parameter. Catalysts comprising the zeolites with a low lattice parameter according to the invention of WO 04/0487988 nevertheless afford high activity combined with good selectivity towards middle distillates.

Other catalysts based on zeolite Y and zeolite beta can also be used.

U.S. Pat. No. 7,510,645 (UOP) describes a hydrocracking catalyst containing a zeolite beta and a zeolite Y, the zeolite Y having a lattice parameter of between 24.38 and 24.50 angstroms (Å), the catalyst being characterized by a Y/beta weight ratio of between 5 and 12. The catalyst has a relatively high proportion of zeolite Y compared to the proportion of zeolite beta. It is demonstrated that these catalysts have improved selectivity and activity compared to conventional commercial catalysts. Also disclosed is a hydrocracking process using said catalysts at high temperature and high pressure to convert a hydrocarbon feedstock into a product having a lower boiling point and lower molecular weight. In particular, the product obtained comprises a large proportion of a component boiling in the temperature range of the naphtha cut (C6-216° C.).

While attempting to develop a new hydrocracking catalyst that is selective towards the naphtha cut, the Applicant discovered, surprisingly, that a catalyst comprising at least one hydrogenating-dehydrogenating element chosen from the group formed by the elements of group VIB and the non-noble elements of group VIII of the Periodic Table, and a support comprising at least one porous mineral matrix, a zeolite Y having an initial lattice parameter $a_0$ of the unit cell of strictly less than 24.40 Å, a BET specific surface area of between 700 and 1000 $m^2/g$, a micropore volume determined by nitrogen adsorption of greater than 0.28 ml/g and a Bronsted acidity of greater than 300 micromol/g, makes it possible to obtain an improved selectivity towards the naphtha cut, notably compared to the catalysts of the prior art.

SUBJECT OF THE INVENTION

More specifically, the present invention relates to a hydrocracking catalyst that is selective towards the naphtha cut, comprising at least one hydrogenating-dehydrogenating element chosen from the group formed by the elements of group VIB and the non-noble elements of group VIII of the Periodic Table, taken alone or as a mixture, and a support comprising at least one porous mineral matrix, a zeolite Y having an initial lattice parameter $a_0$ of the unit cell of strictly less than 24.40 Å, a BET specific surface area of between 700 and 1000 $m^2/g$, a micropore volume determined by nitrogen adsorption of greater than 0.28 ml/g and a Bronsted acidity of greater than 300 micromol/g.

The present invention advantageously relates to a hydrocracking catalyst comprising at least one hydrogenating-dehydrogenating element chosen from the group formed by the elements of group VIB and the non-noble elements of group VIII of the Periodic Table, taken alone or as a mixture, and a support comprising at least one porous mineral matrix, a zeolite Y having an initial lattice parameter $a_0$ of the unit cell of less than 24.40 Å, a BET specific surface area of between 700 and 1000 $m^2/g$, a micropore volume determined by nitrogen adsorption of greater than 0.28 ml/g and a Bronsted acidity of greater than 300 micromol/g.

Another subject of the present invention is a process for hydrocracking a hydrocarbon feedstock in the presence of said catalyst.

One advantage of the present invention is that of providing a hydrocracking catalyst for obtaining an improved selectivity towards the naphtha cut when said catalyst is used in a hydrocracking process according to the invention, compared to the catalysts of the prior art.

In the present invention, the selectivity of the hydrocracking catalysts for naphtha production is determined during a catalytic test and corresponds to the fraction, as a weight percentage, of the product boiling in the range of the naphtha cut, i.e. between the boiling temperature of hydrocarbon compounds containing 6 carbon atoms per molecule (or 68° C. boiling point) up to 216° C., relative to the total mass of product leaving the process.

According to an advantageous embodiment, the catalyst according to the invention also comprises a beta zeolite.

An advantage of the advantageous embodiment of the present invention is that it provides a hydrocracking catalyst comprising said zeolite Y having the claimed specific characteristics and a beta zeolite in a specific Y/beta mass ratio allowing not only improved selectivity towards the naphtha cut to be obtained when said catalyst is used in a hydrocracking process according to the invention, but also improved activity compared to catalysts of the prior art.

In the present invention, the conversion activity of hydrocracking catalysts for naphtha production is determined during a catalytic test by comparing the temperature at which the catalyst must be used to produce at least 65% by weight of products with a boiling point below 216° C. The lower the required temperature, the more active the catalyst. This reduction in temperature makes it possible, for example, to limit the energy consumption of the process and to increase the cycle time for using the catalyst, or even to process less reactive feedstocks without modifying the process capacity and scheme.

Throughout the text hereinbelow, the term “specific surface area” means the BET specific surface area (SBET) determined by nitrogen adsorption in accordance with the standard ASTM 4365-19 established from the Brunauer-Emmett-Teller method described in the journal *The Journal of the American Chemical Society,* 60, 309 (1938). Texture analysis by nitrogen adsorption also allows the micropore volume to be determined, i.e. the volume of pores with an aperture of less than 2 nm. Before analysis, the zeolite powder is activated at 500° C. for 5 hours.

Similarly, the mesopore volume is determined by nitrogen adsorption. Throughout the text hereinbelow, the term “micropores” means pores with an aperture of less than 2 nm, and “mesopores” means pores with an aperture of greater than 2 nm.

Throughout the text hereinbelow, the Brønsted acidity of the zeolite Y is measured by adsorption and subsequent thermodesorption of pyridine followed by infrared spectroscopy (FTIR). This method is conventionally used to characterize acidic solids such as Y zeolites, as described in the journal C. A. Emeis, *Journal of Catalysis,* 141, 347 (1993). Before analysis, the zeolite powder is compacted in the form of a pellet 16 mm in diameter and is activated under secondary vacuum at 450° C. The introduction of pyridine in gas phase in contact with the activated pellet and the thermodesorption step are performed at 150° C. The concentration of pyridinium ion detected by FTIR after thermodesorption at 150° C. corresponds to the Brønsted acidity of the zeolite and is expressed in micromol/g.

For the purposes of the present invention, the various embodiments presented may be used alone or in combination with each other, without any limit to the combinations.

For the purposes of the present invention, the various ranges of parameters for a given step, such as the pressure ranges and the temperature ranges, can be used alone or in combination. For example, for the purposes of the present invention, a preferred range of pressure values can be combined with a range of more preferred temperature values.

In the remainder of the text, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals from columns 8, 9 and 10 according to the new IUPAC classification, and group VIB corresponds to the metals from column 6.

In the text hereinbelow, the expressions “of between . . . and . . . ” and “between . . . and . . . ” are equivalent and mean that the limit values of the interval are included in the described range of values. Should this not be the case and should the limit values not be included in the range described, such a clarification will be provided by the present invention.

DETAILED DESCRIPTION OF THE INVENTION

The Hydrogenating/Dehydrogenating Function

In accordance with the invention, the catalyst comprises at least one hydrogenating-dehydrogenating element chosen from the group formed by the elements of group VIB and the non-noble elements of group VIII of the Periodic Table, taken alone or as a mixture.

Preferably, the group VIII elements are chosen from iron, cobalt and nickel, taken alone or as a mixture, and preferably from nickel and cobalt. Preferably, the group VIB elements are chosen from tungsten and molybdenum, taken alone or as a mixture. The following combinations of metals are preferred: nickel-molybdenum, cobalt-molybdenum, nickel-tungsten, cobalt-tungsten, and very preferably: nickel-molybdenum, nickel-tungsten. It is also possible to use combinations of three metals, for instance nickel-cobalt-molybdenum.

The content in the catalyst of element from group VIII is advantageously between 0.5% and 8% by weight of oxide relative to the total weight of said catalyst, preferably between 0.5% and 6% by weight of oxide and very preferably between 1.0% and 4% by weight of oxide. The content in the catalyst of group VIB element is advantageously between 1% and 30% by weight of oxide relative to the total weight of said catalyst, preferably between 2% and 25% by weight of oxide and very preferably between 5% and 20% by weight of oxide, and even more preferably between 5% and 16% by weight of oxide.

Preferably, the catalyst used according to the invention can also contain a promoter element chosen from phosphorus, boron, silicon, and very preferably phosphorus. When the catalyst contains phosphorus, the phosphorus content is advantageously between 0.5% and 10% by weight of $P_2O_5$ oxide relative to the total weight of said catalyst, preferably between 1% and 6% by weight of $P_2O_5$ oxide and more preferably between 1% and 4% by weight of $P_2O_5$ oxide.

The Support

The catalyst according to the invention comprises a support which comprises and preferably consists of at least one porous mineral matrix, a zeolite Y, preferably a dealuminated zeolite USY, said zeolite Y having an initial lattice parameter $a_0$ of the unit cell of strictly less than 24.40 Å, a BET specific surface area of between 700 and 1000 $m^2$/g, a micropore volume of greater than 0.28 ml/g and a Bronsted acidity of greater than 300 micromol/g.

The porous mineral matrix used in the support of the catalyst, also referred to as binder, advantageously consists of at least one refractory oxide, preferably chosen from the group formed by alumina, silica-alumina, clay, titanium oxide, boron oxide and zirconia, taken alone or as a mixture. Preferably, the porous mineral matrix is chosen from alumina and silica-alumina, taken alone or as a mixture. More preferably, the porous mineral matrix is alumina.

The alumina can advantageously be in any of its forms known to those skilled in the art. Very preferably, the alumina is gamma alumina, for example boehmite.

Preferably, said support comprises from 15% to 55% by weight of binder, preferably from 25% to 50% by weight, and very preferably between 25% and 40% by weight, relative to the total weight of said support.

According to the invention, the support comprises a zeolite Y having an initial lattice parameter $a_0$ of the unit cell of strictly less than 24.40 Å.

Preferably, the initial lattice parameter $a_0$ of the unit cell of the zeolite Y used is less than 24.40 Å, preferably between 24.30 and 24.39 Å, preferably between 24.32 and 24.39 Å, preferably between 24.32 and 24.38 Å and very preferably between 24.34 and 24.38 Å.

The initial lattice parameter $a_0$ of the unit cell of the zeolite Y given is the value of the initial lattice parameter $a_0$ of the zeolite Y used in the synthesis of the catalyst according to the invention.

The initial lattice parameter $a_0$ of the unit cell of the zeolite Y is measured by X-ray diffraction according to the standard ASTM D3942-80.

According to the invention, said zeolite Y has a specific surface area measured by nitrogen physisorption according to the BET method of between 700 and 1000 $m^2$/g, preferably between 750 and 950 $m^2$/g, and preferably between 800 and 950 $m^2$/g.

According to the invention, said zeolite Y has a micropore volume determined by nitrogen adsorption of greater than 0.28 ml/g, preferably greater than 0.285 ml/g, and advantageously less than 0.34 ml/g.

According to the invention, said zeolite Y has a Bronsted acidity of greater than 300 micromol/g, preferably between 320 and 500 micromol/g and preferably between 325 and 425 micromol/g.

Preferably, said zeolite Y has a silica-alumina mole ratio (SAR) of between 5 and 50 and preferably between 5 and 20 and preferably greater than 5 and less than 12.

Preferably, said zeolite Y has a mesopore volume of greater than 0.12 ml/g, preferably greater than 0.16 ml/g and preferably between 0.18 and 0.24 ml/g.

Preferably, said support has a content of zeolite Y, preferably of dealuminated zeolite USY, of between 15% and 80% by weight relative to the total weight of said support, preferably between 20% and 75% by weight and preferably between 40% and 70% by weight.

Said zeolites are advantageously defined in the classification "Atlas of Zeolite Framework Types, 6th revised edition", Ch. Baerlocher, L. B. McCusker, D. H. Olson, 6th Edition, Elsevier, 2007, Elsevier.

According to a preferred embodiment of the invention, the zeolite Y, and preferably the dealuminated zeolite USY, having the particular characteristic defined above and suitable for implementing the support of the catalyst used in the process according to the invention is advantageously prepared from a zeolite Y of FAU structural type preferably having an overall Si/Al atomic ratio after synthesis of between 2.3 and 2.8 and advantageously being in NaY form after synthesis. Said zeolite Y of FAU structural type advantageously undergoes a step of one or more ion exchanges before undergoing the dealumination step. The ion exchange (s) make it possible to partially or completely replace the alkaline cations belonging to groups IA and IIA of the periodic table present in the cation position in the crude synthesis zeolite Y of FAU structural type with $NH_4^+$ cations, and preferably $Na^+$ cations with $NH_4^+$ cations.

Partial or complete exchange of the alkaline cations with $NH_4^+$ cations is understood to mean the exchange of from 80% to 100%, preferably from 85% to 99.5% and more preferably from 88% to 99%, of said alkaline cations with $NH_4^+$ cations. At the end of the ion exchange step(s), the remaining amount of alkaline cations, and preferably the remaining amount of $Na^+$ cations, in the zeolite Y, relative to the amount of alkaline cations, preferably $Na^+$ cations, initially present in the zeolite Y, is advantageously between 0% and 20%, preferably between 0.5% and 15%, and preferably between 1.0% and 12%.

Preferably, this step implements a plurality of ion exchanges with a solution containing at least one ammonium salt chosen from chlorate, sulfate, nitrate, phosphate or acetate salts of ammonium, so as to at least partially remove the alkaline cations, and preferably the $Na^+$ cations, present in the zeolite. Preferably, the ammonium salt is ammonium nitrate $NH_4NO_3$.

Thus, the remaining content of alkaline cations and preferably of $Na^+$ cations in the zeolite Y at the end of the ion exchange(s) step is preferably such that the alkaline cation/aluminium molar ratio, and preferably the Na/Al molar ratio, is between 0:1 and 0:1, preferably between 0:1 and 0.005:1, and more preferably between 0:1 and 0.008:1.

The desired alkaline cation/aluminium, preferably Na/AI, ratio is obtained by adjusting the $NH_4^+$ concentration of the ion exchange solution, the ion exchange temperature and the number of ion exchanges. The $NH_4^+$ concentration of the ion exchange solution advantageously varies between 0.01 and 12 $mol \cdot l^{-1}$, and preferably between 1.00 and 10 $mol \cdot l^{-1}$. The temperature of the ion exchange step is advantageously between 20° C. and 100° C., preferably between 60° C. and 95° C., preferably between 60° C. and 90° C., more preferably between 60° C. and 85° C., and more preferably still between 60° C. and 80° C. The number of ion exchanges advantageously varies between 1 and 10, and preferably between 1 and 4.

Said zeolite Y, preferably of FAU structural type, obtained can then undergo a dealumination treatment step. Said dealumination step may advantageously be carried out by any method known to those skilled in the art. Preferably, the dealumination is carried out by a heat treatment optionally in the presence of water vapour (or "steaming") and/or by one or more acid attacks advantageously carried out by treatment with an aqueous mineral or organic acid solution.

Preferably, the dealumination step implements a heat treatment followed by one or more acid attacks, or just one or more acid attacks.

Preferably, the heat treatment optionally in the presence of steam, to which said zeolite Y is subjected, is carried out at a temperature of between 200° C. and 900° C., preferably between 300° C. and 900° C., more preferably still between 400° C. and 750° C. The duration of said heat treatment is advantageously greater than or equal to 0.5 h, preferably between 0.5 h and 24 h, and very preferably between 1 h and 12 h. In the case where the heat treatment is carried out in the presence of water, the percentage by volume of steam during the heat treatment is advantageously between 5% and 100%, preferably between 20% and 100%, and very preferably between 40% and 100%. Any volume fraction present that is not steam is formed of air. The flow rate of gas formed of steam and possibly air is advantageously between 0.2 $l \cdot h^{-1} \cdot g^{-1}$ and 10 $l \cdot h^{-1} \cdot g^{-1}$ of zeolite Y.

The heat treatment enables the extraction of aluminium atoms from the structure of the zeolite Y while keeping the overall Si/Al atomic ratio of the treated zeolite unchanged.

The step of heat treatment in the presence of steam may advantageously be repeated as many times as is necessary to obtain the dealuminated zeolite USY suitable for implementing the support of the catalyst used in the process according to the invention and having a lattice parameter $a_0$ of the unit cell of strictly less than 24.40 Å.

The step of heat treatment optionally in the presence of steam is advantageously followed by an acid attack step. Said acid attack makes it possible to partially or completely remove the aluminic debris resulting from the step of heat treatment in the presence of steam and which partially blocks the porosity of the dealuminated zeolite; the acid attack thus makes it possible to unblock the porosity of the dealuminated zeolite.

The acid attack may advantageously be carried out by suspending the zeolite Y, which has optionally undergone a heat treatment beforehand, in an aqueous solution containing a mineral or organic acid. The mineral acid may be nitric acid, sulfuric acid, hydrochloric acid, phosphoric acid or boric acid. The organic acid may be formic acid, acetic acid, oxalic acid, tartaric acid, maleic acid, malonic acid, malic acid, lactic acid, or any other water-soluble organic acid. The mineral or organic acid concentration in the solution advantageously varies between 0.01 and 2.0 $mol \cdot l^{-1}$, and preferably between 0.5 and 1.0 $mol \cdot l^{-1}$. The temperature of the acid attack step is advantageously between 20° C. and 100° C., preferably between 60° C. and 95° C., preferably between 60° C. and 90° C. and more preferably between 60° C. and 80° C. The duration of the acid attack is advantageously between 5 minutes and 8 hours, preferably between 30 minutes and 4 hours, and preferably between 1 hour and 2 hours.

On conclusion of the step(s) of heat treatment optionally in the presence of steam and optionally of the acid attack step, the process for modifying said zeolite Y advantageously includes a step of at least partial or complete exchange of the alkaline cations, and preferably the $Na^+$ cations, still present in cation position in the zeolite Y. The ion exchange step is carried out in a similar manner to the ion exchange step described above.

On conclusion of the step(s) of heat treatment optionally in the presence of steam and optionally of the acid attack step and optionally of the step of partial or complete exchange of the alkaline cations and preferably the $Na^+$ cations, the process for modifying said zeolite Y may include a calcination step. Said calcination makes it possible to remove the organic species present within the porosity of the zeolite, for example those supplied by the acid attack step or by the step of partial or complete exchange of the alkaline cations. In addition, said calcination step makes it possible to generate the protonated form of the zeolite Y and to impart upon it an acidity for the purposes of the applications thereof.

The calcination may advantageously be carried out in a muffle furnace or in a tubular furnace, under dry air or under inert atmosphere, in swept bed or in traversed bed. The calcination temperature is advantageously between 200° C. and 800° C., preferably between 450° C. and 600° C., and preferably between 500° C. and 550° C. The duration of the calcination hold is advantageously between 1 and 20 hours, preferably between 6 and 15 hours, and preferably between 8 and 12 hours.

Thus, said zeolite Y obtained, and preferably said dealuminated zeolite USY, has an initial lattice parameter $a_0$ of the unit cell of strictly less than 24.40 Å, a specific surface area measured by nitrogen physisorption using the BET method of between 700 and 1000 $m^2/g$, a micropore volume determined by nitrogen adsorption of greater than 0.28 ml/g and a Bronsted acidity of greater than 300 micromol/g.

In a preferred embodiment, the support also comprises a zeolite beta.

The zeolite beta is generally synthesized from a reaction mixture containing a structuring agent. The use of structuring agents is well known to those skilled in the art: for example, U.S. Pat. No. 3,308,069 describes the use of tetraethylammonium hydroxide, and U.S. Pat. No. 5,139,759 describes the use of the tetraethylammonium cation derived from a tetraethylammonium halide compound. Another standard method for preparing zeolite beta is given in the book "Verified Synthesis of Zeolitic Materials".

The zeolite beta used in the support according to the invention preferably has an overall SAR atomic ratio of between 10 and 100, preferentially between 20 and 50, and more preferably between 20 and 30. The zeolite beta used in the support according to the invention advantageously has a specific surface area measured by nitrogen physisorption according to the BET method of between 400 and 800 $m^2/g$, preferably between 500 and 750 $m^2/g$, and preferably between 550 and 700 $m^2/g$.

In the case where the support comprises a zeolite beta, the support advantageously has a zeolite beta content of between 2% and 40%, preferably between 5% and 35%, and preferably between 10% and 35% by weight relative to the total weight of said support.

In the case where the support comprises a zeolite beta, the weight ratio of said zeolite Y to said zeolite beta in the catalyst is between 1 and 40.

Preferably, the weight ratio of said zeolite Y to said zeolite beta in the catalyst is between 1 and 20, and preferably between 1.2 and 15, and more preferably between 1.2 and 8.

This weight ratio is calculated from the dry masses of zeolites, that is to say the masses of the zeolites corrected for their water content determined by measuring the loss on ignition at 1000° C. (dry mass).

In the case where the support comprises only zeolite USY (without zeolite beta), it preferably consists of:

15% to 80%, preferably from 20% to 70%, and preferably from 40% to 70%, by weight relative to the total weight of said support, of a zeolite Y, preferably of a dealuminated zeolite USY, having an initial lattice parameter $a_0$ of the unit cell of strictly less than 24.40 Å;

from 20% to 85% by weight, preferably between 20% to 60% by weight, and very preferably between 20% and 50% by weight relative to the total weight of said support, of at least one porous mineral matrix.

In the case where the support comprises zeolite USY and zeolite beta, it preferably consists of:

15% to 80%, preferably from 20% to 70%, and preferably from 40% to 70%, by weight relative to the total weight of said support, of a zeolite Y, preferably of a dealuminated zeolite USY, having an initial lattice parameter $a_0$ of the unit cell of strictly less than 24.40 Å;

from 2% to 40%, preferably 5% to 35%, or 10% to 35% by weight relative to the total weight of said support, of a zeolite beta; and from 5% to 83% by weight, preferably between 15% to 40% by weight, and very preferably between 20% and 40% by weight, relative to the total weight of said support, of at least one porous mineral matrix.

Preferably, the catalyst has a content of zeolite Y of between 7% and 78% by weight relative to the total weight of said catalyst.

Preferably, in the case where a zeolite beta is present in the catalyst formulation, said catalyst has a content of zeolite beta of between 2% and 39% by weight relative to the total weight of said catalyst.

Preferably, said catalyst has a content of at least one porous mineral matrix of between 4% and 81% by weight relative to the total weight of said catalyst.

The hydrocracking catalyst advantageously having a Y/beta ratio within these ranges makes it possible not only to obtain an improved selectivity towards the naphtha cut when said catalyst is used in a hydrocracking process according to the invention, but also improved activity compared to the catalysts of the prior art.

Preparation of the Catalyst

The catalyst is advantageously prepared according to the conventional methods used in the prior art.

In particular, the catalyst is prepared according to a preparation process comprising:

- a step of preparing the support, comprising:
  - mixing of at least one porous mineral matrix with a zeolite Y having an initial lattice parameter $a_0$ of the unit cell of strictly less than 24.40 Å, a specific surface area measured by nitrogen physisorption using the BET method of between 700 and 1000 $m^2/g$, a micropore volume determined by nitrogen adsorption of greater than 0.28 ml/g and a Bronsted acidity of greater than 300 micromol/g, and, in the advantageous embodiment where a zeolite beta is present, with a zeolite beta, the weight ratio of said zeolite Y to said zeolite beta in the catalyst being between 1 and 20, and
  - forming said mixture;
- introducing at least one hydrogenating-dehydrogenating element chosen from the group formed by the elements of group VIB of the Periodic Table, preferably nickel and cobalt, the non-noble elements of group VIII of the Periodic Table, preferably iron, cobalt, nickel, and mixtures thereof, and preferably nickel and cobalt, and mixtures thereof, on the support by:
  - adding at least one precursor of said element during the forming so as to introduce at least a portion of said element,
  - impregnating the support with at least one precursor of said element,
  - optionally a step of drying and/or calcining at the end of the preparation of the support and/or of the step of introducing at least one hydrogenating-dehydrogenating element.

More particularly, the catalyst is prepared according to a preparation process comprising the following steps:

a) preparing the zeolite Y, preferably the dealuminated zeolite USY having the specific crystallographic characteristic claimed according to the process described above, b) preparing zeolite beta in the case where a zeolite beta is present in the catalyst formulation according to the invention, c) mixing with a porous mineral matrix and forming to obtain the support, d) introducing at least one hydrogenating-dehydrogenating element on the support by at least one of the following methods:
  - adding at least one precursor of said element during the forming so as to introduce at least a portion of said element,
  - impregnating the support with at least one precursor of said hydrogenating-dehydrogenating element, optionally drying and/or calcining of the products obtained at the end of each of the preparation steps a) or b) or c) or d).

The support may advantageously be formed by any technique known to those skilled in the art. The forming may be performed, for example, by extrusion, by pelletizing, by the drop coagulation (oil-drop) method, by granulation on a rotating plate or by any other method that is well known to those skilled in the art.

The support is preferably formed into grains of various shapes and sizes. They are generally used in the form of cylindrical pellets or polylobal pellets, such as trilobal, quadrilobal or polylobal pellets, of straight or twisted form, but can optionally be manufactured and employed in the form of crushed powders, lozenges, rings, beads or wheels. However, it is advantageous for the catalyst to be in the form of pellets with a diameter of between 0.5 and 5 mm and more particularly between 0.7 and 3 mm and even more particularly between 1.0 and 2.5 mm. The shapes are cylindrical (which may or may not be hollow), twisted cylindrical, multilobal (for example 2, 3, 4 or 5 lobes) or annular. Any other shape may be used.

One of the preferred forming methods consists in co-kneading said zeolites with the binder, preferably alumina, in the form of a wet gel for a few tens of minutes, preferably between 10 and 40 minutes, then passing the paste thus obtained through a die to form pellets with a diameter preferably between 0.5 and 5 mm.

According to another of the preferred forming methods, said zeolites can be introduced during the synthesis of the porous mineral matrix. For example, according to this preferred embodiment of the present invention, said zeolites Y and beta are added during the synthesis of a porous mineral matrix, for instance a silico-aluminic matrix: in this case, said zeolites can advantageously be added to a mixture composed of an alumina compound in an acid medium with a completely soluble silica compound.

The group VIB and/or VIII elements may optionally be introduced during the forming step, by adding at least one compound of said element, so as to introduce at least one portion of said element.

The introduction of at least one hydrogenating-dehydrogenating element can advantageously be accompanied by that of at least one promoter element chosen from phosphorus, boron, silicon and preferably phosphorus and optionally by the introduction of a group VIIA and/or VB element. The formed solid is optionally dried at a temperature of between 60° C. and 250° C. and optionally calcined at a temperature of from 250° C. to 800° C. for a time of between 30 minutes and 6 hours.

The step of introducing at least one hydrogenating-dehydrogenating element is advantageously performed by a method well known to those skilled in the art, in particular by one or more operations of impregnating the formed and calcined or dried, and preferably calcined, support with a solution containing the precursors of the group VIB and/or VIII elements, optionally the precursor of at least one promoter element and optionally the precursor of at least one group VIIA and/or group VB element.

Preferably, said step d) is performed by a method of dry impregnation with a solution containing the precursors of the hydrogenating/dehydrogenating function, that is to say group VIB and/or VIII elements, optionally followed a drying step and preferably without a calcining step.

In the case where the catalyst of the present invention contains a non-noble group VIII metal, the group VIII metals are preferably introduced by one or more operations of impregnation of the formed and calcined support, after those of group VIB or at the same time as the latter.

The introduction of at least one hydrogenating-dehydrogenating element can then optionally be followed by drying at a temperature of between 60° C. and 250° C. and optionally by a calcination at a temperature of between 250° C. and 800° C.

The sources of molybdenum and tungsten are advantageously chosen from the oxides and hydroxides, molybdic and tungstic acids and salts thereof, in particular the ammonium salts such as ammonium molybdate, ammonium heptamolybdate and ammonium tungstate, phosphomolybdic acid, phosphotungstic acid and salts thereof, silicomolybdic acid, silicotungstic acid and salts thereof. Use is preferably made of the oxides and the ammonium salts, such as ammonium molybdate, ammonium heptamolybdate and ammonium tungstate.

The sources of non-noble group VIII elements that can be used are well known to those skilled in the art. For example, for the non-noble metals, use will be made of nitrates, sulfates, hydroxides, phosphates, halides, for instance chlorides, bromides and fluorides, carboxylates, for instance acetates and carbonates.

The preferred source of phosphorus is orthophosphoric acid H3PO4, but salts and esters thereof such as ammonium phosphates are also suitable. The phosphorus may be introduced, for example, in the form of a mixture of phosphoric acid and a basic organic compound containing nitrogen such as aqueous ammonia, primary and secondary amines, cyclic amines, compounds of the pyridine and quinoline families and compounds of the pyrrole family. Tungstophosphoric or tungstomolybdic acids can be used.

The phosphorus content is adjusted, without this limiting the scope of the invention, so as to form a mixed compound in solution and/or on the support, for example tungsten-phosphorus or molybdenum-tungsten-phosphorus. These mixed compounds can be heteropolyanions. These compounds can be Anderson heteropolyanions, for example.

The source of boron may be boric acid, preferably orthoboric acid $H_3BO_3$, ammonium diborate or pentaborate, boron oxide or boric esters. The boron may be introduced, for example, in the form of a mixture of boric acid, aqueous hydrogen peroxide solution and a basic organic compound containing nitrogen such as aqueous ammonia, primary and secondary amines, cyclic amines, compounds of the pyridine and quinoline families and compounds of the pyrrole family. The boron may be introduced, for example, by a solution of boric acid in a water/alcohol mixture.

Many sources of silicon may be used. Thus, use may be made of ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. Silicomolybdic acid and salts thereof, silicotungstic acid and salts thereof may also advantageously be used. Silicon may be added, for example, by impregnation of ethyl silicate in solution in a water/alcohol mixture. Silicon may be added, for example, by impregnation of a silicon compound of silicone or silicic acid type suspended in water.

The sources of group VB elements that can be used are well known to those skilled in the art. For example, among the sources of niobium, use may be made of oxides, such as diniobium pentoxide $Nb_2O_5$, niobic acid $Nb_2O_5 \cdot H_2O$, niobium hydroxides and polyoxoniobates, niobium alkoxides of formula $Nb(OR1)_3$ where R1 is an alkyl radical, niobium oxalate $NbO(HC_2O_4)_5$, or ammonium niobate. Use is preferably made of niobium oxalate or ammonium niobate.

The sources of group VIIA elements that can be used are well known to those skilled in the art. For example, fluoride anions can be introduced in the form of hydrofluoric acid or salts thereof. These salts are formed with alkali metals, ammonium or an organic compound. In the latter case, the salt is advantageously formed in the reaction mixture by reaction between the organic compound and hydrofluoric acid. It is also possible to use hydrolysable compounds which can release fluoride anions in water, such as ammonium fluorosilicate $(NH_4)_2SiF_6$in, silicon tetrafluoride $SiF_4$ or sodium fluorosilicate $Na_2SiF_6$. The fluorine can be introduced, for example, by impregnation of an aqueous solution of hydrofluoric acid or of ammonium fluoride.

Hydrocracking Process

The catalyst according to the invention is then advantageously used in a hydrocracking process, in particular for production of naphtha. The catalyst used in a hydrocracking process, such as the process according to the invention, can advantageously be in sulfide form. The group VIB metals and/or non-noble group VIII metals of said catalyst are therefore present in sulfide form.

The catalysts used in the processes according to the present invention are then advantageously subjected beforehand to a sulfidation treatment for converting, at least in part, the metallic species to sulfide form before they are brought into contact with the feedstock to be treated. This activation treatment by sulfidation is well known to those skilled in the art and can be performed by any method already described in the literature, either in situ, i.e. in the reactor, or ex situ.

A conventional sulfidation method well known to those skilled in the art consists in heating the catalyst in the presence of hydrogen sulfide (pure or for example under a stream of a hydrogen-hydrogen sulfide mixture) at a temperature of between 150° C. and 800° C., preferably between 250° C. and 600° C., generally in a flow-through bed reaction zone.

Another subject of the present invention is a process for hydrocracking at least one hydrocarbon feedstock, preferably in liquid form, of which at least 50% by weight of the compounds have an initial boiling point above 300° C. and a final boiling point below 650° C., at a temperature of between 200° C. and 480° C., at a total pressure of between 1 MPa and 25 MPa, with a ratio of volume of hydrogen per volume of hydrocarbon feedstock of between 80 and 5000 litres per litre and at an hourly space velocity (HSV) defined by the ratio of the volume flow rate of hydrocarbon feedstock, which is preferably liquid, per volume of catalyst charged into the reactor of between 0.1 and 50 $h^{-1}$, in the presence of the catalyst according to the invention.

Advantageously, the catalyst according to the invention is used in the hydrocracking process according to the invention after a pretreatment section containing one or more hydrotreating catalysts which may be any catalyst known to those skilled in the art and which makes it possible to reduce the content of certain contaminants in the feedstock (see below) such as nitrogen, sulfur or metals. The operating conditions (HSV, temperature, pressure, hydrogen flow rate, liquid, reaction configuration, etc.) of this pretreatment section can be diverse and varied in accordance with the knowledge of those skilled in the art.

Feedstocks

Very varied feedstocks can be treated by the hydrocracking processes according to the invention. The feedstock used in the hydrocracking process according to the invention is a hydrocarbon feedstock of which at least 50% by weight of the compounds have an initial boiling point above 300° C. and a final boiling point below 650° C., preferably of which at least 60% by weight, preferably of which at least 75% by weight and more preferably of which at least 80% by weight of the compounds have an initial boiling point above 300° C. and a final boiling point below 650° C.

The feedstock is advantageously chosen from LCOs (Light Cycle Oil, light gas oils resulting from a catalytic cracking unit), atmospheric distillates, vacuum distillates, for instance gas oils resulting from the direct distillation of crude oil or from conversion units, such as FCC, coking or visbreaking units, feedstocks originating from units for the extraction of aromatics from lubricant oil bases or resulting from the solvent dewaxing of lubricant oil bases, distillates originating from processes for the fixed-bed or ebullated-bed desulfurization or hydroconversion of ARs (atmospheric residues) and/or VRs (vacuum residues) and/or deasphalted oils, and deasphalted oil, or paraffins resulting from the Fischer-Tropsch process, taken alone or as a mixture. Mention may be made of feedstocks of renewable origin (such as vegetable oils, animal fats, oil from the hydrothermal conversion or pyrolysis of lignocellulosic biomass) and also plastic pyrolysis oils. The above list is not limiting. Said feedstocks preferably have a boiling point T5 above 300° C., preferably above 340° C., that is to say that 95% of the compounds present in the feedstock have a boiling point above 300° C., and with preference above 340° C.

The nitrogen content of the feedstocks treated in the processes according to the invention is advantageously greater than 500 ppm by weight, preferably between 500 and 10 000 ppm by weight, more preferably between 700 and 4000 ppm by weight and even more preferably between 1000 and 4000 ppm by weight. The sulfur content of the feedstocks treated in the processes according to the invention is advantageously between 0.01% and 5% by weight, preferably between 0.2% and 4% by weight and even more preferably between 0.5% and 3% by weight.

The feedstock may optionally contain metals. The cumulative content of nickel and vanadium in the feedstocks treated in the processes according to the invention is preferably less than 1 ppm by weight.

The feedstock may optionally contain asphaltenes. The asphaltene content is generally less than 3000 ppm by weight, preferably less than 1000 ppm by weight and more preferably still less than 200 ppm by weight.

Advantageously, when the catalyst according to the invention is used after a hydrotreating section as described above, the content of nitrogen, sulfur, metals or asphaltenes in the liquid injected into the process according to the invention using the catalyst according to the invention is reduced. Preferably, the content of organic nitrogen in the feedstock treated in the hydrocracking process according to the invention is then, after hydrotreatment, between 0 and 200 ppm, preferably between 0 and 50 ppm, and even more preferably between 0 and 30 ppm. The sulfur content is preferably less than 1000 ppm and the asphaltene content is preferably less than 200 ppm whereas the content of metals (Ni or V) is less than 1 ppm.

The hydrocracking process according to the invention may comprise a fractionation step between the pretreatment of the feedstock and the hydrocracking reactor(s) using the catalyst according to the invention. In the preferred case where the hydrocracking process is performed without (gas and liquid) fractionation between the pretreatment and the hydrocracking reactor(s) using the catalyst according to the invention, the nitrogen and the sulfur removed from the liquid after the the pretreatment are injected in the form of $NH_3$ and $H_2S$ into the reactor(s) containing the catalyst according to the invention.

In accordance with the invention, the process for hydrocracking said hydrocarbon feedstock according to the invention is performed at a temperature of between 200° C. and 480° C., at a total pressure of between 1 MPa and 25 MPa, with a ratio of volume of hydrogen per volume of hydrocarbon feedstock of between 80 and 5000 litres per litre and at an hourly space velocity (HSV) defined by the ratio of the volume flow rate of hydrocarbon feedstock per volume of catalyst charged into the reactor of between 0.1 and 50 $h^{-1}$.

Preferably, the hydrocracking process according to the invention is performed in the presence of hydrogen at a temperature of between 250° C. and 480° C., preferably between 320° C. and 450° C., very preferably between 330° C. and 435° C., under a pressure of between 2 and 25 MPa, and very preferably between 3 and 20 MPa, at a space velocity of between 0.1 and 20 $h^{-1}$, preferably between 0.1 and 6 $h^{-1}$, preferably between 0.2 and 3 $h^{-1}$ and the amount of hydrogen introduced is such that the litre of hydrogen/litre of hydrocarbon volume ratio is between 100 and 2000 l/l.

The process can be performed in one step or two steps depending on the degree of conversion of the targeted feedstock, with or without recycling of the unconverted fraction. The catalyst according to the invention can be used in a non-limiting manner in one or two steps of the hydrocracking process, alone or in combination with another hydrocracking catalyst.

These operating conditions used in the processes according to the invention generally make it possible to obtain conversions per pass, into products having boiling points of less than 340° C. and better still of less than 370° C., of greater than 15% by weight and more preferably still of between 20% and 100% by weight.

The examples illustrate the invention without limiting the scope thereof.

EXAMPLES

Example 1—Preparation of a Comparative Catalyst A

The support for catalyst A is prepared by forming by kneading-extrusion of 70% by weight of commercial zeolite USY having a lattice parameter of 24.32 Å, an SiO2/Al2O3 mole ratio of 22.9, a specific surface area measured by nitrogen physisorption according to the BET method of 910 $m^2/g$, a micropore volume determined by nitrogen adsorption of 0.30 ml/g and a Bronsted acidity of 200 μmol/g in the presence of commercial boehmite (Pural SB3, Sasol). The pellets obtained are dried at 80° C. then calcined at 600° C. in humid air (5% by weight of water per kg of dry air). The calcined support comprises, on a dry basis, 70% by weight of zeolite and 30% by weight of alumina.

Catalyst A is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst. After dry impregnation, the catalyst is dried at 120° C. in air.

The mass percentages in the catalyst are respectively: 15.1% by weight of molybdenum (in $MoO_3$ form), 3.3% by weight of nickel (in NiO form) on a dry basis.

Example 2—Preparation of a Comparative Catalyst B

The support for catalyst B is prepared by forming by kneading-extrusion of 60% by weight of zeolite USY having a lattice parameter of 24.35 Å, an SiO2/Al2O3 ratio of 12, a specific surface area according to BET method of 845 $m^2/g$, a micropore volume determined by nitrogen adsorption of 0.26 ml/g and a Bronsted acidity of 290 μmol/g, and of 10% by weight of commercial zeolite beta (CP814e, Zeolyst) having an SiO2/Al2O3 mole ratio of 25, a specific surface area measured by nitrogen physisorption according to the BET method of 670 $m^2/g$, in the presence of commercial boehmite (Pural SB3, Sasol). The pellets obtained are dried at 80° C. then calcined at 600° C. in humid air (5% by weight of water per kg of dry air). The calcined support comprises, on a dry basis, 60% by weight of zeolite USY, 10% by weight of zeolite beta and 30% by weight of alumina, i.e. a USY/beta weight ratio of 6.

Catalyst B is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst. After dry impregnation, the catalyst is dried at 120° C. in air.

The mass percentages in the catalyst are respectively: 15.1% by weight of molybdenum (in $MoO_3$ form), 3.3% by weight of nickel (in NiO form) on a dry basis.

Example 3—Preparation of a Comparative Catalyst C

The support for catalyst C is prepared by forming by kneading-extrusion of 70% by weight of zeolite USY having a lattice parameter of 24.35 Å, an SiO2/Al2O3 ratio of 12, a specific surface area according to the BET method of 845 $m^2/g$, a micropore volume determined by nitrogen adsorption of 0.26 ml/g and a Bronsted acidity of 290 μmol/g in the presence of commercial boehmite (Pural SB3, Sasol). The pellets obtained are dried at 80° C. then calcined at 600° C. in humid air (5% by weight of water per kg of dry air). The calcined support comprises, on a dry basis, 70% by weight of zeolite USY and 30% by weight of alumina.

Catalyst C is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst. After dry impregnation, the catalyst is dried at 120° C. in air.

The mass percentages in the catalyst are respectively: 15.1% by weight of molybdenum (in $MoO_3$ form), 3.3% by weight of nickel (in NiO form) on a dry basis.

Example 4—Preparation of a Comparative Catalyst D

The support for catalyst D is prepared by forming by kneading-extrusion of 60% by weight of zeolite Y having a lattice parameter of 24.42 Å, an SiO2/Al2O3 mole ratio of 5.2, a specific surface area measured by nitrogen physisorption according to the BET method of 725 $m^2/g$, a micropore volume determined by nitrogen adsorption of 0.29 ml/g and a Bronsted acidity of 270 μmol/g, and 10% by weight of commercial zeolite beta (CP814e, Zeolyst) having an SiO2/Al2O3 mole ratio of 25, a specific surface area measured by nitrogen physisorption according to the BET method of 670 $m^2/g$, in the presence of commercial boehmite (Pural SB3, Sasol). The pellets obtained are dried at 80° C. then calcined at 600° C. in humid air (5% by weight of water per kg of dry air). The calcined support comprises, on a dry basis, 60% by weight of zeolite USY, 10% by weight of zeolite beta and 30% by weight of alumina, i.e. a USY/beta weight ratio=6 in the catalyst.

Catalyst D is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst. After dry impregnation, the catalyst is dried at 120° C. in air.

The mass percentages in the catalyst are respectively: 15.1% by weight of molybdenum (in $MoO_3$ form), 3.3% by weight of nickel (in NiO form) on a dry basis.

Example 5—Preparation of a Comparative Catalyst E

The support for catalyst E is prepared by forming by kneading-extrusion of 70% by weight of zeolite USY having a lattice parameter of 24.54 Å, an SiO2/Al2O3 mole ratio of 5.4, a specific surface area measured by nitrogen physisorption according to the BET method of 811 $m^2/g$, a micropore volume determined by nitrogen adsorption of 0.28 ml/g and a Bronsted acidity of 600 μmol/g, in the presence of commercial boehmite (Pural SB3, Sasol). The pellets obtained are dried at 80° C. then calcined at 600° C. in humid air (5% by weight of water per kg of dry air). The calcined support comprises, on a dry basis, 70% by weight of zeolite USY and 30% by weight of alumina.

Catalyst E is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst. After dry impregnation, the catalyst is dried at 120° C. in air.

The mass percentages in the catalyst are respectively: 15.1% by weight of molybdenum (in $MoO_3$ form), 3.3% by weight of nickel (in NiO form) on a dry basis.

Example 6—Preparation of a Catalyst F According to the Invention

The support for catalyst F is prepared by forming by kneading-extrusion of 70% by weight of zeolite USY having a lattice parameter of 24.37 Å, an SiO2/Al2O3 mole ratio of 11, a specific surface area measured by nitrogen physisorption according to the BET method of 864 $m^2/g$, a micropore volume determined by nitrogen adsorption of 0.29 ml/g and a Bronsted acidity of 339 μmol/g in the presence of commercial boehmite Pural SB3.

The pellets obtained are dried at 80° C. then calcined at 600° C. in humid air (5 wt % of water per kg of dry air). The calcined support comprises, on a dry basis, 70% by weight of zeolite USY and 30% by weight of alumina. After dry impregnation, the catalyst is dried at 120° C. in air.

Catalyst F is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst.

The mass percentages in the catalyst are respectively: 10% by weight of molybdenum (in $MoO_3$ form), 2.0% by weight of nickel (in NiO form) on a dry basis.

Example 7—Preparation of a Catalyst G According to the Invention

The support for catalyst G is prepared by forming by kneading-extrusion of 60% by weight of zeolite USY having a lattice parameter of 24.37 Å, an SiO2/Al2O3 mole ratio of 11, a specific surface area measured by nitrogen physisorption according to the BET method of 864 $m^2/g$, a micropore volume determined by nitrogen adsorption of 0.29 ml/g and a Bronsted acidity of 339 μmol/g, and 10% by weight of commercial zeolite beta (CP814e, Zeolyst) having an SiO2/Al2O3 mole ratio of 25, a specific surface area measured by nitrogen physisorption according to the BET method of 670 $m^2/g$, in the presence of commercial boehmite (Pural SB3, Sasol).

The pellets obtained are dried at 80° C. then calcined at 600° C. in humid air (5 wt % of water per kg of dry air). The calcined support comprises, on a dry basis, 60% by weight of zeolite USY, 10% by weight of zeolite beta and 30% by weight of alumina, i.e. a Y/beta weight ratio=6 in the catalyst. After dry impregnation, the catalyst is dried at 120° C. in air.

Catalyst G is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst.

The mass percentages in the catalyst are respectively: 10% by weight of molybdenum (in $MoO_3$ form), 2.0% by weight of nickel (in NiO form) on a dry basis.

Example 8—Preparation of a Catalyst H According to the Invention

The support for catalyst H is prepared by forming by kneading-extrusion of 50% by weight of zeolite USY having a lattice parameter of 24.37 Å, an SiO2/Al2O3 mole ratio of 11, a specific surface area measured by nitrogen physisorption according to the BET method of 864 $m^2/g$, a micropore volume determined by nitrogen adsorption of 0.29 ml/g and a Bronsted acidity of 339 μmol/g, and 20% by weight of commercial zeolite beta (CP814e, Zeolyst) having an SiO2/Al2O3 mole ratio of 25, a specific surface area measured by nitrogen physisorption according to the BET method of 670 $m^2/g$, in the presence of commercial boehmite Pural SB3.

The pellets obtained are dried at 80° C. then calcined at 600° C. in humid air (5 wt % of water per kg of dry air). The calcined support comprises, on a dry basis, 50% by weight of zeolite USY, 20% by weight of zeolite beta and 30% by weight of alumina, i.e. a USY/beta weight ratio=2.5 in the catalyst. After dry impregnation, the catalyst is dried at 120° C. in air.

Catalyst H is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst.

The mass percentages in the catalyst are respectively: 10% by weight of molybdenum (in $MoO_3$ form), 2.0% by weight of nickel (in NiO form) on a dry basis.

Example 9—Preparation of a Catalyst I According to the Invention

The support for catalyst I is prepared by forming by kneading-extrusion of 40% by weight of zeolite USY having a lattice parameter of 24.37 Å, an SiO2/Al2O3 mole ratio of 11, a specific surface area measured by nitrogen physisorption according to the BET method of 864 $m^2/g$, a micropore volume determined by nitrogen adsorption of 0.29 ml/g and a Bronsted acidity of 339 μmol/g, and 30% by weight of zeolite beta (CP814e, Zeolyst) having an SiO2/Al2O3 mole ratio of 25, a specific surface area measured by nitrogen physisorption according to the BET method of 670 $m^2/g$, in the presence of commercial boehmite (Pural SB3, Sasol).

The pellets obtained are dried at 80° C. then calcined at 600° C. in humid air (5 wt % of water per kg of dry air). The calcined support comprises, on a dry basis, 40% by weight of zeolite USY, 30% by weight of zeolite beta and 30% by weight of alumina, i.e. a Y/beta weight ratio=1.33 in the catalyst. After dry impregnation, the catalyst is dried at 120° C. in air.

Catalyst I is prepared by dry impregnation of the resulting support using an aqueous solution containing the elements Ni, Mo. This solution is obtained by dissolving the following precursors in water: nickel nitrate and ammonium heptamolybdate. The amount of precursors in solution is adjusted as a function of the targeted concentrations on the final catalyst.

The mass percentages in the catalyst are respectively: 10% by weight of molybdenum (in $MoO_3$ form), 2.0% by weight of nickel (in NiO form) on a dry basis.

Example 10

The performance of the catalysts described previously is evaluated in the hydrocracking of a feedstock comprising a fraction of vacuum distillates and gas oil in one step using an isothermal test pilot unit in downflow configuration.

This test feedstock undergoes hydrotreating (HDT). After this hydrotreating step, the test feedstock has a density at 15° C. of 0.8755 g/ml, a residual nitrogen content of 23 ppm by weight and a residual sulfur content of 16 ppm by weight. The initial point of the simulated distillation for this test feedstock after hydrotreating is 163.3° C. and the final point is 578.7° C. The 50 wt % point of the simulated distillation is at 391.7° C. In order to simulate the partial pressure of hydrogen sulfide and ammonia generated by the HDT step of the process, the test feedstock is additivated respectively with DMDS and aniline so as to obtain 8820 ppm by weight of sulfur and 1900 ppm by weight of nitrogen in the final additivated feedstock.

Each catalyst is evaluated separately and is sulfided prior to the hydrocracking test under an SRGO (straight run gas oil) feedstock, i.e. gas oil derived from the direct distillation of crude oil additivated with 4% by weight of dimethyl sulfide (DMDS) and 2% by weight of aniline. The sulfidation is performed at an HSV of 2 $h^{-1}$ (HSV=Hourly Space Velocity), an $H_2$/feedstock volume ratio of 1000 Nl/l, a total pressure of 140 bar (i.e. 14.0 MPa) and a hold temperature of 350° C. for 6 hours.

After sulfidation, the operating conditions are adjusted to those used for the hydrocracking test: HSV of 1.5 $h^{-1}$, an $H_2$/feedstock volume ratio of 1000 Nl/l, a total pressure of 140 bar (i.e. 14.0 MPa). The temperature of the reactors is adjusted so as to target a net conversion of the 216° C.+ fraction of 65% by weight after 150 hours with feedstock.

The net conversion is defined as the yield of the cut (or fraction) with a boiling point below 216° C. minus the yield of the cut with a boiling point below 216° C. present in the test feedstock.

The performance of the catalysts is compared with that of catalyst D taken as reference and reported in Table 1. The relative activity in degrees Celsius (° C.) is obtained from the difference in temperature between the catalyst to be evaluated and that obtained for the reference catalyst D order to obtain a net conversion of 65%. Similarly, the relative yield of the 68-216° C. cut is taken as the difference between the yields obtained at 65% by weight net conversion of the 216° C.+ cut. A positive value indicates higher activity or yield.

possible to increase the conversion activity while still retaining a high selectivity towards the naphtha cut (catalysts according to the invention F and G). Conversely, the addition of this same zeolite beta to a zeolite USY not in accordance with the invention does not make it possible to obtain this same gain in activity (comparative catalysts B and C).

The invention claimed is:

1. A hydrocracking catalyst comprising at least one hydrogenating-dehydrogenating element selected from the group consisting of elements of group VIB, non-noble elements of group VIII of the Periodic Table and mixtures thereof, and a support consisting of 15 to 80 wt % relative to the total weight of said support of a Y zeolite having an initial crystal lattice parameter $a_0$ of a unit cell of strictly less than 24.40 Å, a BET specific surface area of between 700 and 1000 $m^2/g$, a microporous volume determined by nitrogen adsorption of greater than 0.28 ml/g and a Bronsted acidity of greater than 300 micromols/g, 2 to 40 wt % relative to the total weight of said support of a Beta zeolite having an overall silica/alumina atomic ratio of between 20 and 50, and 5 to 83 wt % relative to the total weight of said support of at least one porous mineral matrix, said catalyst having a weight ratio of zeolite Y to zeolite beta in the catalyst of between 1-40.

TABLE 1

Characteristics and positioning of the performance of catalysts A to I.

| Catalysts | USY lattice parameter (Å) | $S_{BET}$ USY ($m^2/g$) | $V_{micro}$ USY (ml/g) | Acidity of the zeolite Y (μmol/g) | USY/beta mass ratio | USY (wt % relative to the support) | Beta (wt % relative to the support) | Relative activity (° C.) | Relative yield (wt %) |
|---|---|---|---|---|---|---|---|---|---|
| A (comparative) | 24.32 | 910 | 0.30 | 200 | — | 70 | 0 | −13 | 1 |
| B (comparative) | 24.35 | 845 | 0.26 | 290 | 6 | 60 | 10 | −9 | −0.5 |
| C (comparative) | 24.35 | 845 | 0.26 | 290 | — | 70 | 0 | −10 | 0.5 |
| D (comparative) | 24.42 | 725 | 0.29 | 270 | 6 | 60 | 10 | 0 | 0 |
| E (comparative) | 24.54 | 811 | 0.28 | 600 | — | 70 | 0 | −5.5 | 1.5 |
| F (according to the invention) | 24.37 | 864 | 0.29 | 339 | — | 70 | 0 | −7 | 6 |
| G (according to the invention) | 24.37 | 864 | 0.29 | 339 | 6 | 60 | 10 | −4 | 5.5 |
| H (according to the invention) | 24.37 | 864 | 0.29 | 339 | 2.5 | 50 | 20 | 2 | 6.5 |
| I (according to the invention) | 24.37 | 864 | 0.29 | 339 | 1.33 | 40 | 30 | 1 | 5 |

The results reported in Table 1 show that catalysts F, G, H, I according to the invention, consisting of a zeolite USY with a lattice parameter of 24.37 Å, a BET surface area of 864 $m^2/g$, a micropore volume of 0.29 ml/g and an acidity of 339 μmol/g, show a systematic gain in yield towards the naphtha cut compared with the comparative catalysts A, B, C, D and E.

More particularly, it is found that comparative catalyst A, which has a lattice parameter in accordance with the invention but an acidity which is not in accordance with the invention, shows a clear reduction in yield towards the naphtha cut compared with catalyst F in accordance with the invention.

Moreover, the addition of a zeolite beta to the zeolite USY according to the invention also makes it possible to modulate the conversion activity without significantly changing the high selectivity towards the naphtha cut, thus making it possible to obtain catalysts which have both an improved activity and an improved selectivity compared to the prior art. For example, the combination of the zeolite USY according to the invention with the zeolite beta makes it 2. The catalyst according to claim 1, in which the group VIII elements are iron, cobalt, nickel, or a mixture thereof, and the content of group VIII element is between 0.5% and 8% by weight of oxide relative to the total weight of said catalyst.

3. The catalyst according to claim 1, in which the group VIB elements are tungsten, molybdenum, or a mixture thereof, and the content of group VIB element is between 1% and 30% by weight of oxide relative to the total weight of said catalyst.

4. The catalyst according to claim 1, in which said zeolite Y has a Bronsted acidity between 320 and 500 micromols/g.

5. The catalyst according to claim 1, in which the initial lattice parameter $a_0$ of the unit cell of the zeolite Y is between 24.30 and 24.39 Å.

6. The catalyst according to claim 1, in which the weight ratio of said zeolite Y to said zeolite beta in the catalyst is between 1.2 and 8.

7. The catalyst according to claim 1, in which the catalyst has a content of zeolite Y of between 7 and 78% by weight relative to the total weight of said catalyst.

8. The catalyst according to claim 1, in which said catalyst has a content of zeolite beta of between 2 and 39% by weight relative to the total weight of said catalyst.

9. The catalyst according to claim 1, in which said catalyst has a content of at least one porous mineral matrix of between 4 and 81% by weight relative to the total weight of said catalyst.

10. A process for the hydrocracking of at least one hydrocarbon feedstock, of which at least 50% by weight of the compounds have an initial boiling point above 300° C. and a final boiling point below 650° C., comprising performing said hydrocracking at a temperature of between 200° C. and 480° C., at a total pressure of between 1 MPa and 25 MPa, with a ratio of the volume of hydrogen to the volume of hydrocarbon feedstock of between 80 and 5000 litres per litre and at an hourly space velocity (HSV) defined by the ratio of the volume flow rate of hydrocarbon feedstock to the volume of catalyst charged into the reactor of between 0.1 and 50 $h^{-1}$, in the presence of the catalyst according to claim 1.

11. The catalyst according to claim 1, in which the support contains 2 to 75 wt % of the Y zeolite relative to the total weight of said support.

12. The catalyst according to claim 1, in which the support contains 40 to 70 wt % of the Y zeolite relative to the total weight of said support.

13. The catalyst according to claim 1, in which the support contains 15% to 40% by weight of the at least one porous mineral matrix relative to the total weight of said support.

14. The catalyst according to claim 1, in which the support contains 20% to 40% by weight of the at least one porous mineral matrix relative to the total weight of said support.

15. The catalyst according to claim 1, in which the support contains 5% to 35% by weight of the zeolite beta relative to the total weight of said support.

16. The catalyst according to claim 1, in which the support contains 10% to 35% by weight of the zeolite beta relative to the total weight of said support.

17. The catalyst according to claim 1, in which the group VIII elements are cobalt, nickel or a mixture thereof, and the content of group VIII element is between 1.0% and 4% by weight of oxide relative to the total weight of said catalyst.

18. The catalyst according to claim 1, in which the group VIB elements are tungsten, molybdenum, or a mixture thereof, and the content of group VIB element is between 5% and 16% by weight of oxide relative to the total weight of said catalyst.

19. The catalyst according to claim 1, in which said zeolite Y has a Bronsted acidity of 325 to 425 micromols/g.

20. The catalyst according to claim 1, in which the initial lattice parameter $a_0$ of the unit cell of the zeolite Y is between 24.34 and 24.38 Å.

* * * * *